United States Patent [19]

Chen

[11] Patent Number: 5,923,866
[45] Date of Patent: Jul. 13, 1999

[54] METHOD AND APPARATUS FOR REALIZING A KEYBOARD KEY FUNCTION ON A REMOTE CONTROL

[75] Inventor: Chen-Sheng Chen, Yon Ho, Taiwan

[73] Assignee: Acer Incorporated, Taiwan

[21] Appl. No.: 08/638,516

[22] Filed: Apr. 26, 1996

[51] Int. Cl.[6] .................................................. G06F 9/455
[52] U.S. Cl. ..................... 395/500; 395/527; 395/887; 364/578
[58] Field of Search ..................................... 395/500, 800, 395/527, 200.49, 887; 211/261; 251/129.05; 294/905, 907; 340/815.6, 825, 825.51; 341/176; 348/731, 734; 345/169, 168, 170, 172; 364/700, 708.1, 578, 709.09; 463/37; 399/8

[56] References Cited

U.S. PATENT DOCUMENTS

| | | | |
|---|---|---|---|
| 4,718,112 | 1/1988 | Shinoda | 341/22 |
| 5,065,360 | 11/1991 | Kelly | 395/800 |
| 5,099,444 | 3/1992 | Wilson et al. | 364/709.09 |
| 5,148,155 | 9/1992 | Martin | 340/712 |
| 5,307,297 | 4/1994 | Iguchi et al. | 364/708.1 |
| 5,381,142 | 1/1995 | Simmons, Jr. | 341/26 |
| 5,406,273 | 4/1995 | Nishida et al. | 340/825.51 |
| 5,426,450 | 6/1995 | Drumm | 345/168 |
| 5,440,699 | 8/1995 | Farradl | 395/155 |
| 5,451,953 | 9/1995 | Duffield | 341/176 |
| 5,459,462 | 10/1995 | Venkidu et al. | 341/22 |
| 5,515,052 | 5/1996 | Darbee | 341/176 |
| 5,592,657 | 1/1997 | Johnson et al. | 395/500 |
| 5,603,060 | 2/1997 | Weinberger et al. | 399/8 |
| 5,650,831 | 7/1997 | Farwell | 348/734 |
| 5,652,630 | 7/1997 | Bertram et al. | 348/734 |
| 5,661,505 | 8/1997 | Livits | 345/169 |
| 5,681,220 | 10/1997 | Bertram et al. | 463/37 |
| 5,724,106 | 3/1998 | Autry et al. | 348/734 |

*Primary Examiner*—Kevin J. Teska
*Assistant Examiner*—Russell W. Frejd
*Attorney, Agent, or Firm*—Townsend and Townsend and Crew

[57] ABSTRACT

A flexible, cost-effective apparatus and method for using a key on a remote control to simulate a keyboard key, i.e. to cause an application, upon pressing the key on the remote control, to perform the same function that the application performs upon pressing the key of the keyboard. In brief, the method comprises (a) storing, in a first memory, data corresponding to the key of the keyboard, at an address corresponding to the key of the remote control, prior to execution of the application; (b) pressing the key of the remote control during execution of the application; (c) converting a signal, produced as a result of step (b), into the address corresponding to the key of the remote control; (d) transmitting the data stored in the first memory at the address to the host processor; and (e) in response to step (d), performing the function.

34 Claims, 1 Drawing Sheet

METHOD AND APPARATUS FOR REALIZING A KEYBOARD KEY FUNCTION ON A REMOTE CONTROL

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Computer systems incorporating multimedia functions are increasingly being designed with user-friendliness in mind, as they move into the consumer product market. For this reason, remote controls have become essential, or at least highly desirable, in various computer systems. It would be desirable for a key on a remote control to be able to simulate a keyboard key, so that the remote control could be used in conjunction with existing applications expecting keyboard input. However, it would not be practical to have a one-to-one mapping from each key on a computer keyboard to corresponding keys on a remote control, given that there are usually more than 100 keys on a keyboard and a remote control is designed to be handheld and, thus, can only have a limited number of keys. On the other hand, because of the desirability of using a remote control with a variety of existing applications requiring different keyboard input, a fixed mapping between keys on the remote control and keyboard keys would not be particularly useful. What is needed is a technique that allows a user to redefine the keyboard keys to be simulated by the keys on the remote control, according to the keyboard input expected by the intended application. Such a technique would, for example, be particularly useful in game playing since different games require different keyboard input (e.g., the arrow keys, the space key, the enter key).

SUMMARY OF THE INVENTION

Accordingly, the present invention provides a flexible, cost-effective apparatus and method for using a key on a remote control to simulate a keyboard key, i.e. to cause an application, in response to the user pressing the key on the remote control, to perform the same function that the application performs when the user presses the key of the keyboard. The present invention also allows users to map a key of the remote control to any desired keyboard key. The present invention utilizes widely available standard components in personal computer systems to realize the above objects at minimum cost.

In brief, the method according to the present invention comprises (a) storing, in a first memory, data corresponding to the key of the keyboard, at an address corresponding to the key of the remote control, prior to execution of the application; (b) receiving a signal signifying the pressing of the key of the remote control during execution of the application; (c) converting a signal, produced as a result of step (b), into the address corresponding to the key of the remote control; (d) transmitting the data stored in the first memory at the address to the host processor; and (e) in response to step (d), performing the function. The apparatus according to the present invention comprises (a) a first memory for storing data corresponding to the key of the keyboard, at an address corresponding to the key of the remote control, prior to execution of the application; (b) means for converting a signal, produced when the key of the remote control is pressed during execution of the application, into the address corresponding to the key of the remote control; and (c) means for transmitting the data stored in the first memory at the address to the host processor.

A further understanding of the nature and advantages of the present invention can be realized by reference to the remaining portions of the specification and drawing.

BRIEF DESCRIPTION OF THE DRAWING

The drawing illustrates a block diagram of an apparatus that uses a remote control to simulate keyboard input, in accordance with the invention.

DESCRIPTION OF A PREFERRED EMBODIMENT

Figure 1:
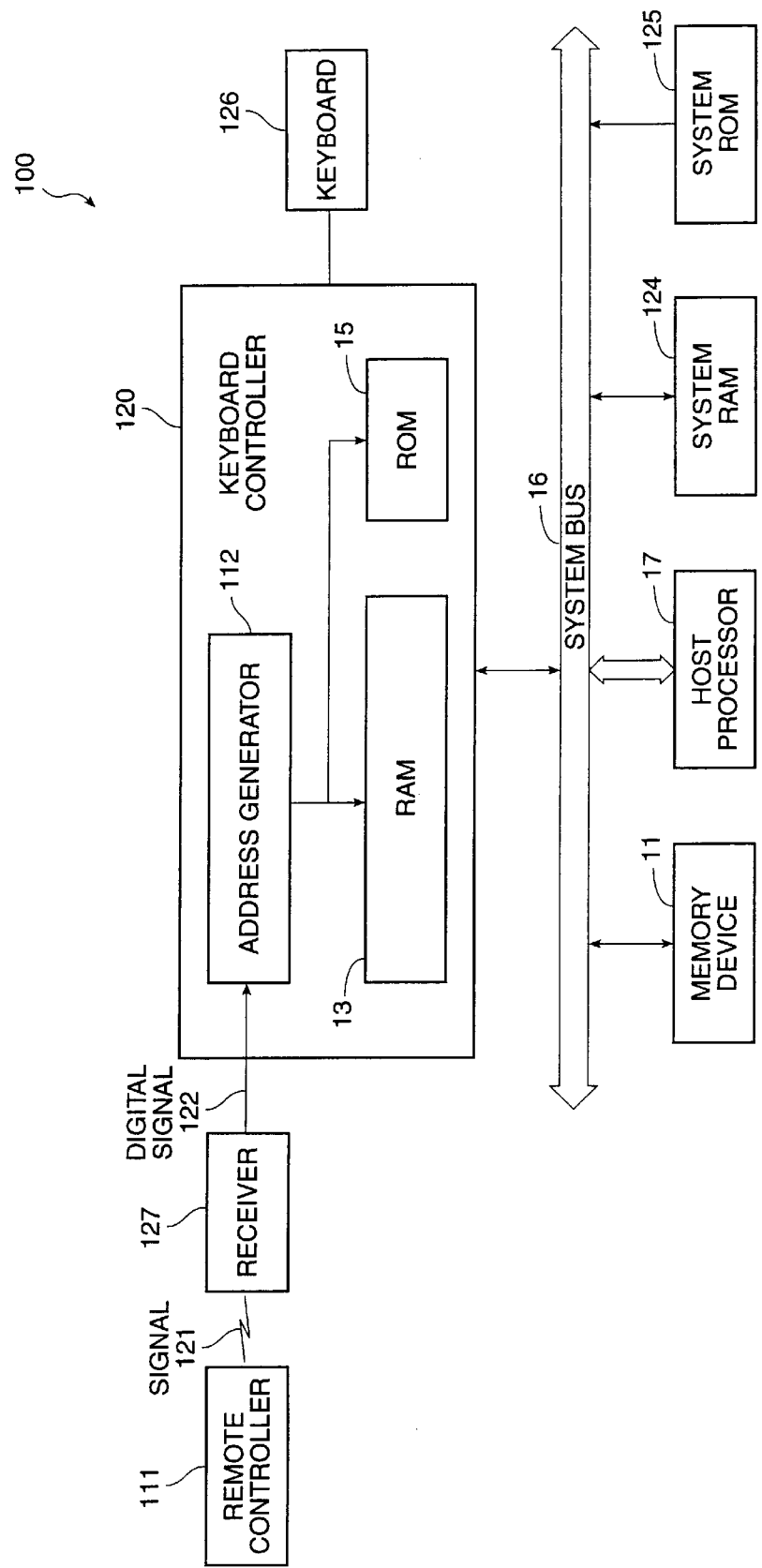

The drawing illustrates a block diagram of an apparatus that uses a remote control to simulate keyboard input during the execution of an application expecting keyboard input. A computer, which in the specific embodiment is an IBM-compatible personal computer system 100, includes a keyboard 126, a keyboard controller 120, a remote control 111, a receiver 127, a memory device 11, a host processor 17 for running the application, a system random access memory (RAM) 124, a system read only memory (ROM) 125 and a system bus 16. Keyboard controller 120 includes an address generator 112, a RAM 13 and a ROM 15. (It will be obvious to one of ordinary skill that the present invention is applicable to non-IBM compatible personal computer systems and to computer systems other than personal computer systems).

The invention provides a technique for simulating a particular key of the keyboard with a specific key of the remote control. At some point before execution of the application expecting keyboard input, data representing the particular keyboard key is stored into memory device 11 at an address corresponding to the specific key on remote control 111. In a preferred embodiment, memory device 11 is a permanent or non-volatile memory (i.e. the data stored therein is not lost upon loss of power) and, in particular, the Real Time Clock CMOS memory (RTCMOS) which is commonly used to store system configuration parameters. The most frequently used RTCMOS contains 128 bytes of memory space with the first 64 (40H) bytes reserved for storing system configuration parameters and the last 64 bytes available for storage of user data.

In some embodiments, the data stored in memory device 11 representing the particular keyboard key includes the make code and break code of the particular keyboard key (i.e. the codes generated by the keyboard when the particular keyboard key is pressed and released, respectively). The system Basic Input/Output System (BIOS) converts make and break codes into corresponding scan and ASCII codes.

In other embodiments, for some keyboard keys, only the make code is stored because the break code for a particular keyboard key can be determined from the make code for the particular key (i.e. by adding 80H to the make code). However, the break codes for some "extended" keys (such as "PAUSE" and "SCROLL LOCK") cannot be determined from the corresponding make codes.

The above described storing of data into memory device 11 can be accomplished by means of a program (hereinafter referred to as "the key-defining program"), executing on host processor 17, which allows a user to press the particular keyboard key to be simulated by the specific remote control key. Such a program could display, in turn, each user-definable remote key and prompt the user to enter a desired corresponding keyboard key to be simulated. The make code and break code of the keyboard key pressed by the user, in response to the display of a specific remote control key, would then be saved into memory device 11, at an address corresponding to the specific remote control key. Where memory device 11 is the RTCMOS, the "OUT" machine instruction could be used for carrying out the above described storing into memory device 11, given that there are I/O ports associated with the address and data lines, of the RTCMOS. (In one embodiment the key-defining program can be executed as part of the BIOS setup program.)

The make and break codes of a keyboard key may each consist of up to four bytes. In embodiments where memory device 11 is the RTCMOS, eight bytes of the RTCMOS starting at hexadecimal address 40H are reserved for the make and break codes of the keyboard key corresponding to the first user-definable remote control key, eight bytes of the RTCMOS starting at hexadecimal address 48H are reserved for the make and break codes of the keyboard key corresponding to the second user-definable remote control key, etc. (One or more remote control keys may be system-defined. The make and break codes corresponding to such keys are stored in ROM 15 of controller 120.) The advantage of saving the make codes and break codes into a permanent memory (such as the RTCMOS) is that they will not be lost when computer system 100 is turned off. Therefore, the user does not have to go through the same procedure of defining the remote user keys each time the computer is powered up, unless the user wishes to change the stored data (i.e. run a different application expecting different keyboard input). In other embodiments, memory device 11 could be a floppy or hard disk.

In yet other embodiments the make codes and break codes could be saved into system RAM 124 and then immediately loaded into RAM 13 by the key-defining program. However, in such embodiments, the key-defining program would have to be executed upon each power-up of computer system 100.

Upon a power-up of computer system 100, the make and break codes stored in memory device 11 are loaded into RAM 13 of keyboard controller 120, starting, in one embodiment, at address 21H. (In other embodiments, a different start address in RAM 13 could be used.) The above loading of RAM 13 can be implemented by the Power On Self Test (POST) routine of the Basic Input/Output System (BIOS) stored in system ROM 125 and executed whenever computer system 100 is powered up. In particular, if memory device 11 is the RTCMOS, then the BIOS POST routine could be modified to retrieve the stored make and break codes from the RTCMOS (using the "IN" machine instruction to read from the data I/O port of the RTCMOS) and to store these retrieved codes into RAM 13 of controller 120 (using "OUT" machine instructions for writing to the command and data ports of controller 120 (e.g. "OUT 61H, 64" (command port) and "OUT 60, <data>" (data port)).

When a user presses a key on remote control 111 (during the execution of an application on host processor 17), remote control 111 emits a (preferably infrared) signal 121 corresponding to the pressed key. Receiver 127 is coupled to keyboard controller 120 (via pin 31, if controller 120 is a standard 8742 IC controller chip) and receives signal 121 and converts signal 121 into a digital signal 122 identifying the pressed remote control key. In one embodiment, signal 122 includes a header (which is used to notify controller 120 that the following data in signal 122 is not noise) and a customer code (which enables controller 120 to determine that signal 122 was intended to be received by controller 120 and not by another controller of a nearby computer).

Address generator 112 in one embodiment includes a firmware program actually stored in ROM 15 of controller 120 and either a decoder or a lookup table also stored in ROM 15, for converting digital signal 122 into the address (in RAM 13 or ROM 15) corresponding to the pressed remote key. Address generator 112 determines whether digital signal 122 corresponds to a user-defined remote control key. If so, address generator 112 converts digital signal 122 into the address of RAM 13 corresponding to the pressed remote control key and places the make and break codes previously stored in RAM 13 at that address (e.g. during execution of the BIOS POST routine upon the last power up of computer system 100) into the data I/O port of keyboard controller 120 (i.e. onto output pins D0–D7 of controller 120, in embodiments where controller 120 is an 8742 chip). In one embodiment, a value of 0H stored in RAM 13 at the address corresponding to the pressed remote key indicates that the key has not yet been defined by the user.

On the other hand, if address generator 112 determines that digital signal 122 corresponds not to a user-defined key, but rather to a system-defined key, then address generator 112 converts digital signal 122 into the address of ROM 15 corresponding to the pressed remote control key and places the make and break codes previously stored in ROM 15 at that address into the data I/O port of keyboard controller 120. In either case, in embodiments where only make codes are stored in memory device 11, only the make code corresponding to the pressed remote control key is retrieved by address generator 112, which then generates the corresponding break code as described above and places both codes into the data I/O port of keyboard controller 120.

After address generator 112 has placed, into the data I/O port of controller 120, the data that represents the keyboard key corresponding to the pressed remote control key, operation proceeds as if the represented keyboard key had been pressed instead of the remote key. Specifically, keyboard controller 120 generates an interrupt 09H to host processor 17 to indicate that keyboard data is available. In response to the interrupt, an interrupt handler for interrupt 09H (which is stored in system ROM 125) begins to execute. The interrupt handler for interrupt 09H retrieves the data stored in the data I/O port of keyboard controller 120, generates corresponding data and stores the corresponding data into the ROM BIOS keyboard buffer area (whose start address in system RAM 124 is 40:1EH). At some later point, the user's application executing on host processor 17 retrieves the data from the BIOS keyboard buffer area, by generating, either directly or through an operating system-provided service, a standard 16H interrupt for keyboard service (the 16H interrupt routine will convert the data retrieved from the ROM BIOS keyboard area into corresponding scan and ASCII codes for the represented keyboard key which are passed on to the application), and takes the appropriate action (for example, moving a cursor on a display screen left in response to reading the ASCII code for a left arrow key).

In conclusion, it can be seen that the present invention provides a simple, and elegant technique for providing flexibility in a computer system with a remote control. The cost associated with implementing the invention can be kept low by making use of existing keyboard controller ICs (such as 8042 or 8742), programmed to carry out the function of address generator 112 as described above, in conjunction with minor modifications in the BIOS program (i.e. a change to the POST routine causing it to load RAM 13 of controller 120 with codes stored in memory device 11 upon power-up, as discussed above).

While the above is a complete description of a preferred embodiment of the invention, various modifications, alternative constructions, and equivalents may be used. For example, in some embodiments, address generator 112 could include only a hardware decoder without a firmware program, but would preclude the programmability of the locations in RAM 13 and ROM 15 storing the user and system defined keys, respectively. Therefore, the above description and illustration should not be taken as limiting the scope of the invention which is defined by the claims.

APPENDIX

The appendix to this application is a firmware program listing for implementing address generator 112 in one embodiment of the invention.

APPENDIX

```
ena_dev_100:
        in      a, p1           ; read data from input port(2 cycle)
        jb4     ena_dev_60
        orl     p2, #48h        ; disabled KB & PD clock
;       GET REMOTE CONTROLLER SIGNAL
;       call    remote_control
;       anl     p2, #0feh       ; set bit0 0
        mov     TEMP1, #3h
        mov     TEMP0, #0a0h
pulse_header:
        in      a, p1
        jb4     ena_dev_40
        djnz    TEMP0, pulse_header  ; around 3.260ms
        djnz    TEMP1, pulse_header  ; around 3.260*2ms(6.460ms)
;       orl     p2, #01h
header_low:                     ; make sure this is a header
        in      a, p1
        cp1     a
        jb4     header_low
;       anl     p2, #0feh
;       mov     TEMP0, #0ach    ; around 2.187ms
        mov     TEMP0, #0edh    ; around 3ms
repeat_key:
        in      a, p1
        cp1     a
        jb4     repeat_exit     ; repeat key
        djnz    TEMP0, repeat_key
;       orl     p2, #01h
customer_high;
        in      a, p1
        jb4     customer_high
        mov     TEMP0, #10h     ; bypass customer code
        call    cycle_pulse     ; high to low as 1 cycle
;       GET DATA
;       call    get_data        ; put data to accumulator
        jmp     get_data
;       jmp     com_exit
repeat_exit:
        in      a, p1
;       jb4     com_exit
        jb4     repeat_exit1
        jmp     repeat_exit
repeat_exit1:
        mov     COUNTER, #COUNTER_DATA
        inc     @COUNTER
        mov     a, @COUNTER
        xrl     a, #03h
        jnz     com_exit
        mov     TEMP0, #REPEAT_DATA
        mov     a, @TEMP0       ;saved data to RAM area
        jmp     obf_empty1      ; send code to obf
        anl     a, #01fh
        rl      a
        mov     COUNTER, a      ; a pointer to first data
```

APPENDIX-continued

```
        inc     COUNTER         ; COUNTER pointer to second data
resend:
        movp    a, @a
        mov     TEMP0, a
        xrl     a, #0e0h
        jnz     normal_code
e0_code:
        anl     p2, #0feh
        mov     a, TEMP0
        out     dbb, a          ; send data to ouput buffer
        orl     p2, #10h        ; generate IRQ1
        mov     TEMP0, #59h
        djnz    TEMP0, $        ; delay 305us
        anl     p2, #0cfh
;       orl     p2, #01h
check_obf:
        jobf    check_ibf
        jmp     go_continue
check_ibf:
        jnibf   check_obf
        in      a, dbb
        jmp     check_obf
go_continue:
        mov     a, TEMP1
        jb1     first_time
        inc     COUNTER
        mov     a, COUNTER
        movp    a, @a
        orl     a, #080h
        mov     TEMP0, a
        jmp     normal_code
first_time:
        mov     a, COUNTER
        movp    a, @a
        mov     TEMP0, a
        dec     COUNTER
normal_code
;       anl     p2, #0feh
        mov     a, TEMP0
        out     dbb, a          ; send data to output buffer
        orl     p2, #10h        ; generate IRQ1
        mov     TEMP0, #50h
        djnz    TEMP0, $        ; delay 305us
        anl     p2, #0cfh
;       orl     p2, #01h
check_obf1:
        jobf    check_ibf1
        jmp     go_continue1
check_ibf1:
        jnibf   check_obf1
        in      a, dbb
        jmp     check_obf1
go_continue1:
        mov     a, COUNTER
        djnz    TEMP1, resend
pulse_end:
;       anl     p2, #0feh
        in      a, p1
        cp1     a
        jb4     pulse_end       ; when end the remote, should be
        mov     COUNTER, #COUNTER_DATA
        mov     #COUNTER, #0h
;       orl     p2, #01h
;       ret                     ; pulse low
        jmp     com_exit
;get_data        endproc
;------------------------------------------------------------------
; Description: Cycle_pulse, according to R0, determine how many
;               pulse bypassed
; Input         : TEMP0(R0)
;------------------------------------------------------------------
cycle_pulse     proc
pulse_low:
        in      a, p1           ;
        cp1     a               ;
        jb4     pulse_low       ; jmp if p14 low
pulse_high:
        in      a, p1
        jb4     pulse_high      ; jmp if p14 high
```

APPENDIX-continued

```
      djnz   r0, pulse_low
      ret
cycle_pulse  endproc
```

What is claimed is:

1. In a data processing system having a keyboard, a remote control, and a host processor on which an application is executing, the application performing a function when a key of the keyboard is pressed, a method for simulating the key of the keyboard with a key of the remote control, the method comprising the steps of:

(a) storing, in a first memory, data including a make code representing the key of the keyboard, at an address corresponding to the key of the remote control that is to simulate the key of the keyboard, prior to execution of the application;

(b) receiving an input signal signifying the pressing of the key of the remote control during execution of the application;

(c) converting the input signal into the address corresponding to the key of the remote control;

(d) transmitting the data stored in the first memory at the address to the host processor; and (e) in response to step (d), performing the function.

2. The method of claim 1, wherein step (d) is performed by a controller IC chip.

3. The method of claim 1, wherein the first memory is a Random Access Memory (RAM).

4. The method of claim 1, wherein the first memory is a Read Only Memory (ROM).

5. The method of claim 2, wherein the first memory is located in the controller IC chip.

6. The method of claim 5, wherein step (c) comprises:

(c1) converting the input signal into a digital signal and supplying the digital signal to the controller IC chip; and (c2) converting, in the controller IC chip, the digital signal into the address corresponding to the key of the remote control.

7. The method of claim 6, wherein a decoder is used to perform step (c2).

8. The method of claim 6, wherein a lookup table is used to perform step (c2).

9. The method of claim 2, wherein the controller IC chip is a keyboard controller.

10. The method of claim 2, wherein step (d) comprises:

(d1) retrieving the data from the first memory and placing the data in an input/output port of the controller IC chip; and (d2) generating an interrupt to the host processor, the interrupt causing the host processor to retrieve the data from the input/output port.

11. In a data processing system having a keyboard, a remote control, and a host processor on which an application is executing, the application performing a function when a key of the keyboard is pressed, a method for simulating the key of the keyboard with a key of the remote control, the method comprising the steps of:

(a) storing, in a first memory, data representing the key of the keyboard, at an address corresponding to the key of the remote control that is to simulate the key of the keyboard, prior to execution of the application;

(b) receiving an input signal signifying the pressing of the key of the remote control during execution of the application;

(c) converting the input signal into the address corresponding to the key of the remote control;

(d) transmitting the data stored in the first memory at the address to the host processor;

(e) in response to step (d), performing the function; and (f) storing, in a second memory, the data representing the key of the keyboard, at an address corresponding to the key of the remote control;

wherein the first memory is volatile, the second memory is non-volatile, step (f) is performed prior to step (a), and step (a) comprises retrieving the data from the second memory before storing the data in the first memory.

12. The method of claim 11, wherein step (a) is performed by a routine that is executed by the host processor each time the data processing system is powered up.

13. The method of claim 11, wherein the second memory is a Real Time CMOS Clock (RTCMOS) memory.

14. The method of claim 11, wherein the second memory is a floppy disk.

15. The method of claim 11, wherein the second memory is a hard disk.

16. In a data processing system having a keyboard, a remote control, and a host processor on which an application is executing, the application performing a function when a key of the keyboard is pressed, an apparatus for simulating the key of the keyboard with a key of the remote control, the apparatus comprising:

a first memory for storing data including a make code representing the key of the keyboard, at an address corresponding to the key of the remote control that is to simulate the key of the keyboard, prior to execution of the application;

means for converting a signal, produced when the key of the remote control is pressed during execution of the application, into the address corresponding to the key of the remote control; and means for transmitting the data stored in the first memory at the address to the host processor.

17. The apparatus of claim 16, wherein the means for transmitting are contained in a controller IC chip.

18. The apparatus of claim 16, wherein the first memory is a Random Access Memory (RAM).

19. The apparatus of claim 16, wherein the first memory is a Read Only Memory (ROM).

20. The apparatus of claim 17, wherein the first memory is located in the controller IC chip.

21. The apparatus of claim 20, wherein the means for converting comprises:

a receiver that converts the signal, produced when the key of the remote control is pressed, into a digital signal and that supplies the digital signal to the controller IC chip; and an address generator, in the controller IC chip, that converts the digital signal into the address corresponding to the key of the remote control.

22. The apparatus of claim 21, wherein the address generator comprises a decoder.

23. The apparatus of claim 21, wherein the address generator comprises a lookup table.

24. The apparatus of claim 17, wherein the controller IC chip is a keyboard controller.

25. The apparatus of claim 17, wherein the means for transmitting comprise:

means for retrieving the data from the first memory and placing the data in an input/output port of the controller IC chip; and means for generating an interrupt to the host processor, the interrupt causing the host processor to retrieve the data from the input/output port.

26. The apparatus of claim 16, further comprising:

a second memory for storing the data representing the key of the keyboard, at an address corresponding to the key of the remote control;

wherein the first memory is volatile, the second memory is non-volatile, the data is stored in the second memory prior to being stored in the first memory and the data stored in the first memory is copied from the second memory.

27. The apparatus of claim 26, wherein the data is retrieved from the second memory and stored in the first memory each time the data processing system is powered up.

28. The apparatus of claim 26, wherein the second memory is a Real Time CMOS Clock (RTCMOS) memory.

29. The apparatus of claim 26, wherein the second memory is a floppy disk.

30. The apparatus of claim 26, wherein the second memory is a hard disk.

31. In a data processing system having a keyboard, a remote control, and a host processor on which an application is executing, the application performing a function when a key of the keyboard is pressed, an apparatus for simulating the key of the keyboard with a key of the remote control, the apparatus comprising:

a memory for storing data representing the key of the keyboard, at an address corresponding to the key of the remote control that is to simulate the key of the keyboard, prior to execution of the application;

a transmitter for transmitting an analog signal corresponding to the key of the remote control;

a receiver for receiving the analog signal and converting the analog signal to a digital signal identifying the key of the remote control; and an address generator for converting the digital signal into the address corresponding to the key of the remote control, retrieving the data stored in memory, and transferring the data stored in memory to a keyboard controller.

32. The apparatus of claim 31, wherein the keyboard controller generates an interrupt to the host processor to indicate that the data is available at the keyboard controller.

33. In a data processing system having a keyboard, a remote control, and a host processor on which an application is executing, the application performing a function when a key of the keyboard is pressed, a method for simulating the key of the keyboard with a key of the remote control, the method comprising:

storing, in a first memory, data representing the key of the keyboard, at an address corresponding to the key of the remote control that is to simulate the key of the keyboard, prior to execution of the application;

receiving an input signal signifying the pressing of the key of the remote control during execution of the application;

converting the input signal into the address corresponding to the key of the remote control;

transmitting the data stored in the first memory at the address to the host processor using a controller IC chip; and performing the function in response to transmitting the data stored in the first memory.

34. The method of claim 33, wherein transmitting the data comprises:

retrieving the data from the first memory and placing the data in an input/output port of the controller IC chip; and generating an interrupt to the host processor, the interrupt causing the host processor to retrieve the data from the input/output port.

* * * * *